Dec. 20, 1966     H. PFAU     3,292,245

PROCESS AND APPARATUS FOR MAKING ROTORS

Filed Feb. 20, 1962

INVENTOR

HANS PFAU

BY: *McGlew and Toren*

ATTORNEYS

United States Patent Office 3,292,245
Patented Dec. 20, 1966

3,292,245
PROCESS AND APPARATUS FOR MAKING ROTORS
Hans Pfau, Duisburg, Germany, assignor to DEMAG Aktiengesellschaft, Duisburg, Germany
Filed Feb. 20, 1962, Ser. No. 174,621
4 Claims. (Cl. 29—156.8)

This invention relates, in general, to rotor constructions and to a method of forming a rotor, and in particular to a new and useful rotor construction for an axial flow turbine compressor and similar device, and to a method of forming such rotor.

In the manufacture of rotors for axial turbines and axial compressors, it is essential that extreme care be taken to insure the stability and strength of the rotors which are formed. The requirements with regard to strength and stability are particularly difficult to meet in respect to the securing of the lower portions or feet of the rotors.

Prior to the present invention, it has been established that the greatest stability is obtained in a rotor construction where the vanes and the hub consist of a single piece. However, the manufacture of such a rotor in a single piece is very difficult.

In accordance with the present invention, an improved rotor construction is provided by a process in which the vanes are joined together individually one after the other and welded at their feet along lines extending parallel to the axis or on a coaxial cylinder surface of the rotor. To accomplish this, an apparatus is provided to mount one of the vanes on a rotary member having indications thereon corresponding to the number of vanes which will eventually be formed into the rotor. An additional vane is then mounted in a clamping member and the two are brought together so that the feet align on each side. Thereafter, welding is accomplished along the puncture between feet in a direction parallel to the axis or on a coaxial surface of the rotor to be formed. Additional vanes are connected one at a time in the same manner. When all of the vanes have been welded together, a vane ring is formed by the connections of the rotor feet. The vane ring is subsequently connected with a hub body by means of one or more annular welding seams made to connect the hub body to the vane ring.

The process is advantageously carried out using the apparatus by securing a first vane or a complete segment of vanes to the rotatable arm in such a manner that the vanes which have been connected together may be swung through an arc to align with the next vane which is positioned in a stationary clamping member. An advantage of the method is that each vane, as it is welded to the other vanes in the already formed segment, is relieved from the clamping device so that no internal pressures will be built up and it will be permitted to freely expand and cool.

The process proposed in the present invention prevents the occurrence of partial joints between the individual vane feet which may be apt to cause localized stress areas which may fail. This results in a very considerable advantage providing a vane ring which is capable of absorbing tangential stresses and tensions and the danger of radial crevice or cleavage formation during the production of the annular seam is entirely prevented.

With such a process, it is possible to use all types of materials which are capable of being welded. The finished rotor does not contain any joints and therefore, for practical purposes, it is in an ideal state similar to a rotor which has been made from a single piece. In addition, it is possible, in accordance with the inventive process, to make a precise division between the individual vanes of the overall rotor construction.

Accordingly, it is an object of this invention to provide an improved process for manufacturing a rotor.

A further object of the invention is to provide an improved device for facilitating the manufacture of rotors.

A further object of the invention is to provide an improved process for manufacturing a rotor for an axial compressor, turbine and the like, comprising joining together individual blades of the rotor one after the other at their feet by welding along lines substantially parallel to the axis or on a coaxial cylinder surface of the rotor which will eventually be formed and thereafter joining the ring of blades thus formed to a central body member by welding.

A further object of the invention is to provide a rotor construction which includes a plurality of individual rotor blades having foot portions which are joined together along welding seams extending substantially parallel to the axis or on a coaxial cylinder surface of the formed rotor and includes a central hub body which is joined to the ring of rotor blades by welding.

A further object of the invention is to provide an apparatus for welding individual blades of a rotor together to form a complete rotor ring structure including a rotatable arm, an indicator ring having graduations thereon corresponding to the number of vanes formed in the rotor, clamping means on the arm for clamping a blade or a segment comprising a plurality of blades thereon and means for clamping an individual rotor blade adjacent the rotatable arm for joining each individual blade in succession to form an overall rotor ring.

A further object of the invention is to provide an improved process for manufacturing a rotor which is simple to execute, economical to carry out and produces an improved rotor structure.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
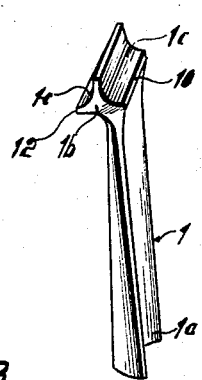
FIG. 1 is a perspective view of an individual rotor vane constructed in accordance with the invention.
Figure 3:
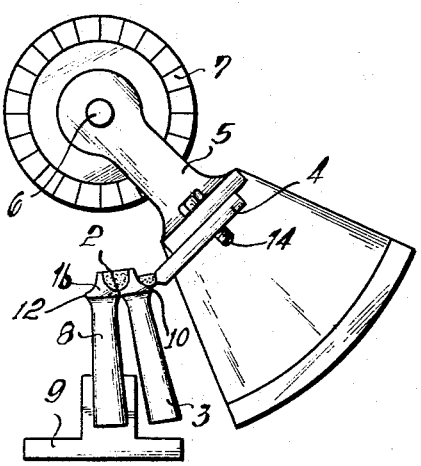
Figure 5:
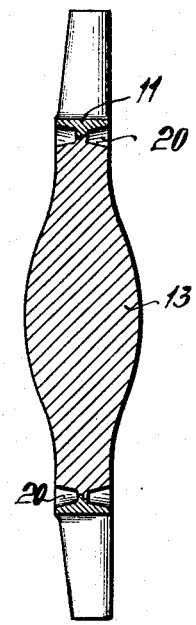
Figure 4:
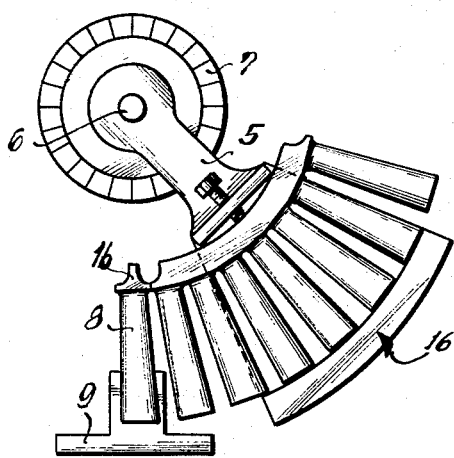

FIG. 3 indicates an apparatus for holding two rotor blade elements together for joining together by welding constructed in accordance with the invention;

FIG. 4 is a view of the apparatus of FIG. 1 indicating a segment held by the apparatus for joining together of an additional vane thereto; and FIG. 5 is a transverse section of a rotor with the blades welded together in a ring and maintained on each side of the inner peripheries as formed prior to being welded to the central disc.

Referring to the drawings in particular, the invention embodies therein as indicated in FIG. 1 includes a rotor which is made up of a plurality of blades or vanes generally designated 1 which includes a blade portion 1a and a foot portion 1b. The foot portion is elongated in an axial direction in respect to the overall rotor which will be formed and includes curved sides 1c, 1c which form fillers J-shaped formations to receive a weld in accordance with the invention.

Figure 2:
FIG. 2 is a perspective view indicating the joining together of two vanes by welding.

In accordance with the invention, a ring formed of rotor blades is made by placing two of the rotor blades 1 together as indicated in FIG. 2 with an axial elongated edge 10 of one abutting an axially elongated edge 12 of the other. In this position, they are welded together in a jointless manner by welding as indicated at 2 to completely fill the U-welding groove or space formed between the curved portions 1c, 1c of adjacent vanes 1.

As indicated in FIG. 3, the preferred apparatus for carrying out a preferred form of the method is indicated. The apparatus includes an indicating ring generally designated 7 upon which is rotatably mounted on a pin 6 a rotating clamping arm 5. The clamping arm 5 is initially provided with a holding piece element 4 which is bolted thereto by means of a bolt. To effect the formation of the rotor wheel, a first rotor element 3 is welded to the piece 4 which is secured on the end of the rotatable arm 5. A second rotor blade element 8 is then clamped in a clamping device 9 and the arm 5 is rotated to cause the blade element 3 to be positioned with its elongated axial edge 12 adjacent the elongated axial edge 10 of the blade element 8. When this is done means on the opposite side of the indicator disc (not shown) are provided to secure the pin 6 against turning in order to lock the arm 5 in its aligned position. Thereafter, the blade elements 3 and 8 are joined together by a welding seam 2 made between opposing side faces 1c, 1c of the foot portions along a line extending substantially parallel to the axis of the rotor which will be formed.

After a full quarter segment of the rotor is formed by joining together a plurality of the vane element in the manner described above, a complete quarter segment generally designated 16 is mounted on the arm 5 by suitable clamping means (not shown) after piece 4 is first removed. Additional vanes are added to the segment 14 until a complete ring is formed by joining together all the vane feet. During the manufacture of the complete rotor, care has to be taken that each vane is exactly positioned in the proper alignment with the segment which has already been formed. The apparatus which includes the rotatable arm insures that accurate alignment will be accomplished. In order to insure that the segment 14 is accurately positioned on the arm 5, the arm 5 is first rotated up to the mounting position of the first and then rotated to the mounting position of the last vane. The indicated disc 7 is then adjusted with regard to the division between the vanes and the welding of all the additional vanes is then set by positioning the arm 5 in relation to the indicated disc 7.

In the process of the invention, it is possible to insure that the same relative position in relation to the center of the rotor which is to be formed is achieved for each of the vane elements. Thus, any accuracies or form changes which may occur during the welding of each individual vane element will not be additive. Thus, upon securing of a new vane in position, any displacement or misalignment which has occurred during the preceding welding which may be due, for example, to shrinking or stress relieving due to temperature changes or the like is automatically reconsidered by the accurate positioning of the arm 5 so that an absolute uniform vane ring is formed. An important step in the process is that each vane element, after it is welded to the segment, is released from its clamping member and permitted to expand and cool so that no stresses are locked into the rotor which is formed. By permitting each vane element to freely expand after it has been welded, the resultant rotor will be free of any tensions or stresses which may cause failure during its operation.

After a complete ring generally designated 11 of vane elements is formed, it is placed around a hub member or body 13 as indicated in FIG. 5 and the two structures are welded together by first machining annular welding seams on each side of the ring 11 at the locations 20, 20 of FIG. 5 and thereafter applying welds around such seams.

While a specific embodiment of the invention has been shown and described in detail to illustrate the application of the invention principles, it will be understood that the invention may be embodied otherwise without departing from such principles.

What is claimed is:

1. A process for manufacturing a rotor for an axial compressor, turbine and the like from individual blade elements having foot portions which are elongated in an axial direction, comprising positioning a pair of individual blade elements of the rotor together, joining the pair of elements together along their foot portions by welding to form a segment, adding an additional blade element one at a time to the blade element segment thus formed and welding along their foot portions while releasing the added blade element to permit stress relieving after each is welded, repeating the adding of blade elements to form an entire ring, thereafter placing a body member centrally of the ring thus formed and joining the body member to the ring by welding.

2. A process according to claim 1, wherein said body member is joined to said ring by making at least two annular welding seams.

3. A process for the manufacture of a rotor for an axial compressor, turbine and the like using individual vanes having foot portions, comprising positioning and clamping a pair of individual blade elements of the rotor together with their foot portions abutting in the orientation which they would assume in a finished rotor, joining the pair of elements together along their foot portions to form a segment, releasing the added blade element after welding to permit unhindered movement of the complete blade and foot portion for stress relieving, adding additional blade elements one at a time to the blade element segment being thus formed by positioning each in turn to the segment and clamping each in position and welding each blade in succession along their foot portions while it is clamped in position, releasing the added blade element after welding each time to permit unhindered movement of the added blade element and stress relieving, and repeating the adding of blade elements to form an entire ring.

4. A process according to claim 3, wherein the vane foot portions of the blade elements are welded together without joints in a direction which extends parallel to the axis of the rotor which will eventually be formed.

References Cited by the Examiner

UNITED STATES PATENTS

| | | | |
|---|---|---|---|
| 1,549,215 | 8/1925 | Peters | 113—99 |
| 2,450,493 | 10/1948 | Strub | 253—77 |
| 2,454,580 | 11/1948 | Thielemann | 29—156.8 |
| 2,669,957 | 2/1954 | Vogt | 113—99 |
| 2,709,568 | 5/1955 | Thielemann | 253—77 |
| 2,815,728 | 12/1957 | Fenimore | 113—99 |
| 2,922,619 | 1/1960 | Slemmons | 253—77 |
| 2,995,338 | 8/1961 | Clarke et al. | 253—77 |
| 3,010,187 | 11/1961 | Glasson | 29—156.8 |
| 3,032,864 | 5/1962 | Webb | 253—77 |

MARK NEWMAN, Primary Examiner.

WALTER BERLOWITZ, JOSEPH H. BRANSON, JR., KARL J. ALBRECHT, DONLEY J. STOCKING, SAMUEL LEVINE, Examiners.

I. GENDELMAN, H. F. RADUAZO,
Assistant Examiners.